United States Patent [19]

Ozaki et al.

[11] 4,233,137
[45] * Nov. 11, 1980

[54] METHOD OF HEAT RECOVERING FROM HIGH TEMPERATURE THERMALLY CRACKED HYDROCARBONS

[75] Inventors: Kiyoji Ozaki, Yokohama; Akinobu Fukuhara, Sagamihara; Takuji Hosoi, Kawasaki; Yasuo Sagi, Iwaki, all of Japan

[73] Assignees: Chiyoda Chemical Engineering & Construction Co., Ltd., Yokohama; Kureha Kagaku Kogyo Kabushiki Kaisha, Tokyo, both of Japan

[*] Notice: The portion of the term of this patent subsequent to Apr. 24, 1996, has been disclaimed.

[21] Appl. No.: 25,494

[22] Filed: Mar. 30, 1979

Related U.S. Application Data

[63] Continuation of Ser. No. 855,310, Nov. 28, 1977, Pat. No. 4,150,716, which is a continuation of Ser. No. 655,957, Feb. 6, 1976, abandoned.

[30] Foreign Application Priority Data

Feb. 7, 1975 [JP] Japan .................... 50-15252

[51] Int. Cl.² .................... C10G 9/16; C10J 3/86
[52] U.S. Cl. .................... 208/48 Q; 48/197 R; 48/210; 48/211; 122/7 R; 201/41; 585/950

[58] Field of Search ............ 165/1, 60, 111, DIG. 12; 208/130, 48 Q; 260/679 R, 683 R; 48/197 R, 210, 211, 212; 252/373; 122/7 R; 201/41; 585/950, 535, 537, 539, 650, 910, 911

[56] References Cited

U.S. PATENT DOCUMENTS

| | | | |
|---|---|---|---|
| 2,904,502 | 9/1959 | Shapleigl | 208/130 |
| 2,928,886 | 3/1960 | Nisbet et al. | 585/650 |
| 3,329,735 | 7/1967 | Paul et al. | 585/652 |
| 3,647,907 | 3/1972 | Sato et al. | 585/650 |
| 3,676,519 | 7/1972 | Dom et al. | 585/650 |
| 3,725,491 | 4/1973 | Voigt et al. | 585/535 |
| 4,150,716 | 4/1979 | Ozaki et al. | 165/1 |

*Primary Examiner*—Peter F. Kratz
*Attorney, Agent, or Firm*—Frishauf, Holtz, Goodman & Woodward

[57] ABSTRACT

A method for recovering sensible heat from a thermally decomposed high temperature hydrocarbon gas product in the form of high pressure steam of from 40 to 100 kg/cm² has been discovered. This method comprises pre-cooling at first the thermally decomposed gas product of high temperature by mixing said gas product with sprayed low temperature hydrocarbon oil as a quenching oil to a temperature of about 300° to 400° C.; and then passing the mixture through the tubes of a shell-and-tube type heat exchanger so as to transfer the heat of said resulting mixture into a high pressure water flowing through the space of the shell side thereof to recover a high pressure steam, followed by separating the condensed hydrocarbon oil from the mixture to reuse said oil by recirculation.

11 Claims, 3 Drawing Figures

METHOD OF HEAT RECOVERING FROM HIGH TEMPERATURE THERMALLY CRACKED HYDROCARBONS

This application is a continuation application of Ser. No. 855,310, filed Nov. 28, 1977 now U.S. Pat. No. 4,150,716; which, in turn, is a continuation of Ser. No. 655,957, filed Feb. 6, 1976, now abandoned.

This invention relates to a method of recovering heat from a cracked hydrocarbon gas of high temperature in the form of high pressure steam.

Heretofore, there is known a method of recovering heat from thermally cracked high temperature hydrocarbon gases produced by the thermal cracking or decomposition of naphtha, kerosine, light oil, asphalt, crude oil or coal. This method comprises rapidly cooling the high temperature cracked gas product of about 900° C. by quenching with an oil to a temperature of less than 300° C., separating the gas product and the quenching oil from each other, and introducing the quenching oil separated into the tubes of a heat exchanger so as to transfer the heat of said oil to water surrounding said tubes to recover said sensible heat as a high pressure steam. (Hereinafter referred as conventional method No. 1. See Canadian Pat. No. 949,486.)

In conventional method No. 1, however, only the quenching oil separated is introduced into the tubes of heat exchanger to recover the heat thereof. In general, when a quenching oil is maintained at a high temperature for a long period of time, the viscosity of said quenching oil increases because of the deterioration thereof. As the contents of pitch and heavy components increase, the effective recovery of heat becomes more difficult. Because of these difficulties, it is necessary to lower the temperature of the quenching oil to less than 300° C., resulting in that the pressure of steam recovered becomes to 20 kg/cm² at most.

Further, there is known another method of so-called Schmidt type heat recovering process. (Hereinafter referred as conventional method No. 2. See Chemical Engineering Progress Vol. 68, No. 7, pages 53 to 56.) In this method, high temperature (about 750° to 850° C.) thermally cracked gas of naphtha is directly passed through the tubes of a heat exchanger, giving the heat thereof to high pressure water surrounding said tubes to obtain a high pressure steam of 70 to 120 kg/cm². However, coking of hydrocarbons is apt to occur on the inside walls of the heat exchanger tubes, which results in making it impossible to operate the process for a long period of time by gradual blocking of said tubes with cokes generated therein.

An object of this invention is to recover the heat of high temperature thermally cracked or decomposed hydrocarbon gases in the form of high pressure steam of about 40 to 100 kg/cm², whose pressures are higher and more useful than in the case of conventional method No. 1, and lower and less coke-forming than in the case of conventional method No. 2.

This object can be attained in accordance with the present invention by cooling a high temperature gas product obtained by thermal cracking or decomposition of hydrocarbons by means of mixing said high temperature gas with sprayed low temperature hydrocarbon oil to a temperature of about 300° to 400° C.; passing the mixture through the tubes of a shell-and-tube type heat exchange means so as to transfer the heat of said mixture into a high pressure water which flows through the space of the shell side to obtain a high pressure steam; and separating the condensed hydrocarbon oil from the gas to reuse said oil by recirculation.

The present invention will best be understood and appreciated from the following description of the process taken in connection with the accompanying drawings in which.

Figure 1:
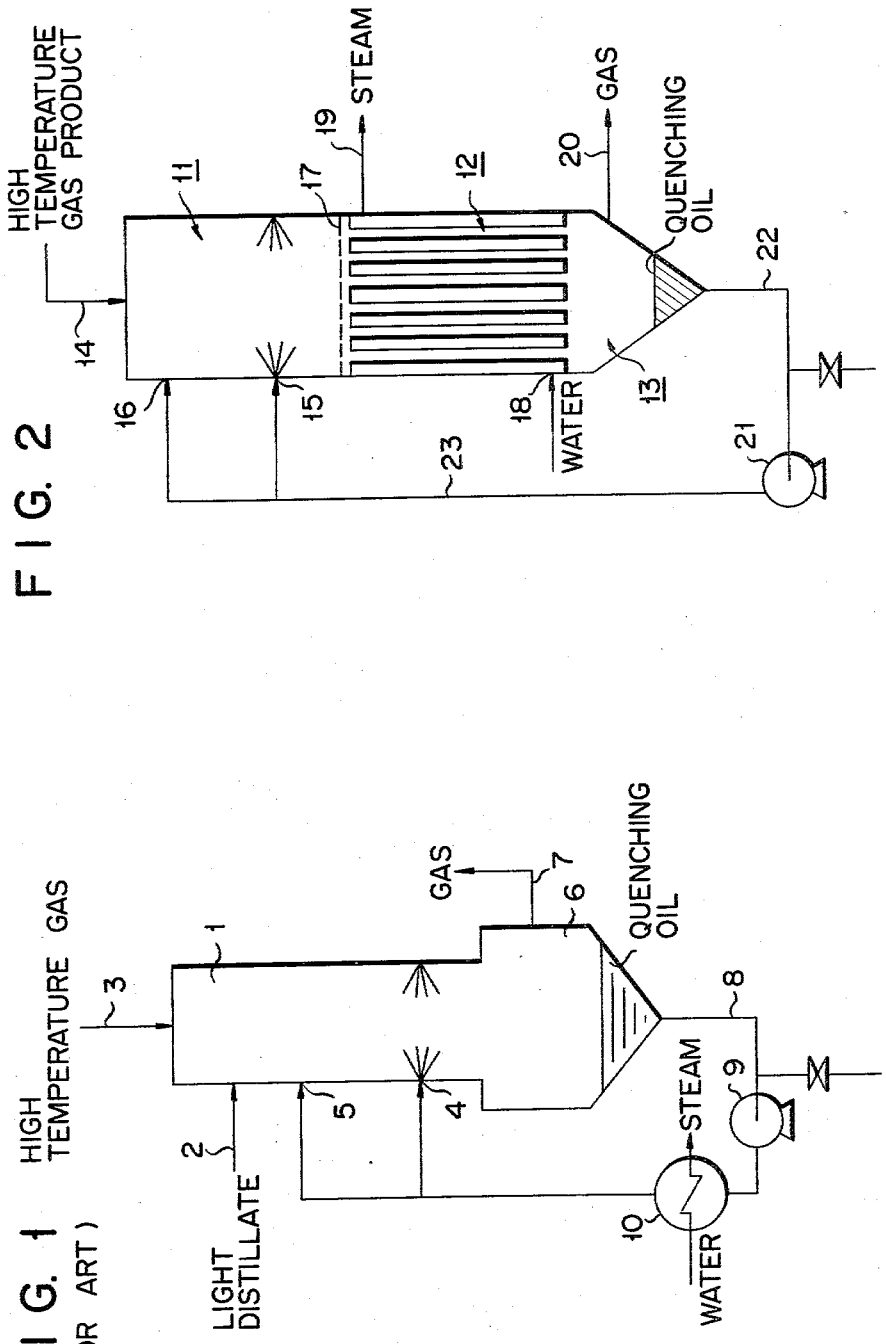
FIG. 1 is a schematic flow sheet of the conventional method No. 1.

At first, an embodiment of control experiment of conventional method No. 1 will be explained in detail with reference to FIG. 1. A distillate of Arabian Light crude oil was introduced into a high temperature reaction chamber 1 through an inlet pipe 2, and thermally cracked by a high temperature gas introduced into the same reaction chamber 1 through an inlet pipe 3 under almost the same condition as in Example 1 hereinafter described, the thermal cracking temperature being 905° C. The thermally cracked product was rapidly cooled to about 250° C. by a quenching oil sprayed through an inlet 4 thereinto, the temperature of said oil being 190° C. A small amount of the same quenching oil as above was introduced into the chamber through an inlet 5 in order to form a falling film for preventing coking on the inside wall of the reaction chamber 1.

The liquid-gas mixture including the thermally cracked gas product was naturally separated into a gaseous substance and an oily substance in a lower portion 6 of the reaction chamber 1, and the gaseous substance was withdrawn from an outlet 7. The oily substance, that is, the quenching oil, which stood in the bottom portion of the reaction chamber 1, was withdrawn from an outlet 8 to be introduced circulatingly into the chamber 1 through a circulating pump 9, a shell-and-tube heat exchanger 10 and two inlet pipes 4 for spraying and 5 for providing a falling film. The circulating quenching oil contained about 27% by weight of pitch.

The temperature of inlet water of heat exchanger 10 was 20° C., and the temperature and the pressure of steam obtained were 165° C. and 7 kg/cm² respectively, and heat recovery efficiency was about 75%.

Figure 2:
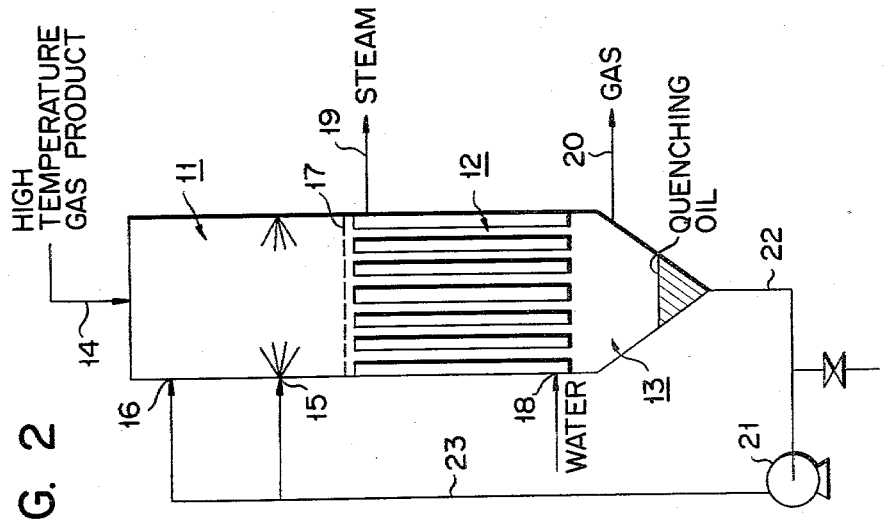
FIG. 2 is a schematic flow sheet of the method of this invention.

Next, the process of the present invention will be explained more in detail with reference to FIG. 2.

The heat recovering apparatus of this invention comprises a pre-cooling zone 11, a heat recovery zone 12 and a separating zone 13. A high temperature gas product formed by thermal cracking or decomposition of hydrocarbons having a temperature of from 450° to 1400° C. is introduced into the pre-cooling zone 11 through a conduit pipe 14. The gas product is brought into contact with a sprayed quenching oil having a temperature of from 250° to 350° C. which is sprayed into the gas product through nozzles 15, whereby the gas product is cooled to about 300° to 400° C. The nozzles 15 are installed on the circumference of the pre-cooling zone 11 so as to cause the quenching oil to be sprayed or dispersed uniformly into the pre-cooling zone 11. Also, a small amount of the quenching oil is supplied in the pre-cooling zone 11 through slits 16 installed to the upper circumference of the pre-cooling zone 11, and falls down along the inside wall of the pre-cooling zone, whereby the deposition of coke on the surface of the wall of said pre-cooling zone is prevented. As shown in FIG. 2, this small amount of quenching oil is part of the recirculating oil supplied from the bottom of the separating zone 13. However, another oil may be supplied from an outside source for this purpose.

The high temperature gas product introduced into the pre-cooling zone 11 is mixed with sprayed quenching oil and cooled to about 300° to 400° C. Then, the mixture enters the tubes of a shell-and-tube heat exchanger disposed in the heat recovering zone 12 through a fluid distributing perforated plate 17 mounted above the heat exchanger. In this case, the main part of the liquid component in the mixture introduced into the tubes falls down along the inside walls of said tubes, forming a thin liquid film layer on the inside wall of each tube. The gas product containing the remainder of the liquid component passes through the tubes at a speed of 15 to 50 meters per second, preferably 20 to 50 meters per second. The gas and liquid streams passing through the tubes of heat exchanger are cooled to about 250° to 350° C. giving their heat to water which is introduced into the space of the shell side through an inlet pipe 18, giving rise to the recovery of high pressure steam of 40 to 100 kg/cm$^2$ which flows out through a steam pipe 19.

In the separating zone 13 of the heat recovery system, the gaseous component in the mixture is separated naturally from the liquid component, and the former is withdrawn from the system through an outlet pipe 20 as the desired thermally cracked gas for subsequent treatment, while the latter, after removing a pitch component contained therein if necessary, is recycled to the upper portions of the system by means of a circulating pump 21 through pipes 22 and 23 for reuse as the quenching oil.

As a high temperature cracked gas product applicable to the heat recovery process of this invention, there are some petroleum hydrocarbon products such as naphtha cracked gas, cracked gas of gas oils, cracked gas of crude oils and cracked gas of residues, as well as a gas product obtained from coal hydrocarbons such as those gases formed by carbonization, hydrocarbonization, gasification or hydrogasification of coals.

As mentioned before, coke formation is prevented from forming on the inside wall of the pre-cooling zone above the inlet for quenching oil by flowing down part of the quenching oil along said inside wall. A flow of steam over 150° C. along the wall with the quenching oil can prevent the occurrence of coking.

When the mixture of sprayed quenching oil and high temperature gas product enters the tubes of the heat exchanger, the main of the liquid component in the mixture forms a thin falling film layer along the inside wall of each tube. The mainly gaseous remainder component of the mixture flows down through the tubes at a high speed along the inside surface, with the result that the thickness of the falling liquid film layer is reduced noticeably. This improves the heat transfer rate through the film layer, and the efficiency of heat exchange becomes several times higher than the conventional method No. 1.

The low temperature hydrocarbon oil used as the quenching oil in the present invention should be a by-product heavy oil from the thermal cracking or gasification of the hydrocarbons. If necessary, however, it is possible to use other hydrocarbon oils supplied from an outside source as the quenching oil otherwise than by recirculation. The hydrocarbon oil used as the quenching oil must have properties which give almost no evaporation at the pre-cooling temperature and it has a high thermal stability (e.g. an oil enriched with aromatics). The quenching oil may be properly selected from the standpoints of such various factors as reaction temperature, pre-cooling temperature, weight ratio of the quenching oil and the cracked gas product, temperature of the circulating quenching oil, and the retention time for quenching.

The method of this invention described above offers the following advantages over the conventional heat recovery systems.

1. Since the retention time for the mixture of quenching oil and high temperature gas product in the pre-cooling zone is very short, the quenching oil deteriorates less than in the case of conventional method No. 1, and so the temperature at the inlet of the heat exchange means can be increased to about 400° C. without changing the quality of quenching oil, with the result that high pressure steam of from 40 to 100 kg/cm$^2$ can be recovered in that heat exchanger. This invention recovers the heat energy contained in the product of thermal cracking or gasification of hydrocarbons at an exceedingly high level.

2. In the case of conventional method No. 1, the heat exchanger used for the recirculating quenching oil requires an extremely large heat exchange area because of the low heat transfer rate on the oil side, making said method very uneconomical. On the contrary, in the heat exchanger employed in this invention, the thickness of falling film layer of the liquid component becomes very thin because of the high temperature gas component also passing along the inside surface of heat exchanging tubes, which makes the system of this invention very profitable and economical.

3. In the case of conventional method No. 2, the high temperature gas product obtained by thermal cracking or gasification is introduced directly into a heat exchanger, and so coking occurs often and particularly on the inside walls of the heat exchange tubes even if the process is carried out with great care. Lower on-stream time results. In particular, when a heavy oil is used as the raw material for thermal cracking, the operation of this system becomes impossible in practice. Contrarily, in the system of the present invention, a thin liquid film layer is formed on the inside walls of the heat exchange tubes, which prevents the occurrence of coking on the surface thereof and makes it possible to operate the system for a long period of time.

4. In the case of conventional method No. 1, it is required that the temperature of quenching oil be reduced while passing through the heat exchanger. Therefore the content of pitch in the quenching oil should be maintained at less than 30 percent by weight because of viscosity. Contrarily, in the system of this invention, the pitch content in the quenching oil can be increased to about 80 percent by weight, that is, in the range of from 30 to 80 percent by weight of pitch, and so the range of the usable quenching oils is widened.

5. In the system of this invention, the recycling rate of quenching oil is smaller than that in the case of conventional method No. 1 because the inlet temperature of the heat exchanger is higher than that in the case of conventional method No. 1. Since no heat exchanger is employed in the recycle system of the present invention, the pressure loss, and the pumping head for recycling quenching oil may be smaller than in the case of conventional method No. 1.

6. The conventional method No. 2 has low heat recovery and it is difficult to cool the gas product below the dew point of the gas. The system of this invention has no such fault and gives high heat recovery efficiency.

7. In the system of conventional method No. 2, the high temperature cracked gas product passes through heat exchanger tubes directly, and so corrosion occurs when the gas product contains hydrogen sulfide. Contrarily, the system of this invention has a thin liquid film on the inside walls of the heat exchange tubes active as protection.

The method of the present invention will be more fully understood referring to the following examples.

EXAMPLE 1

Figure 3:
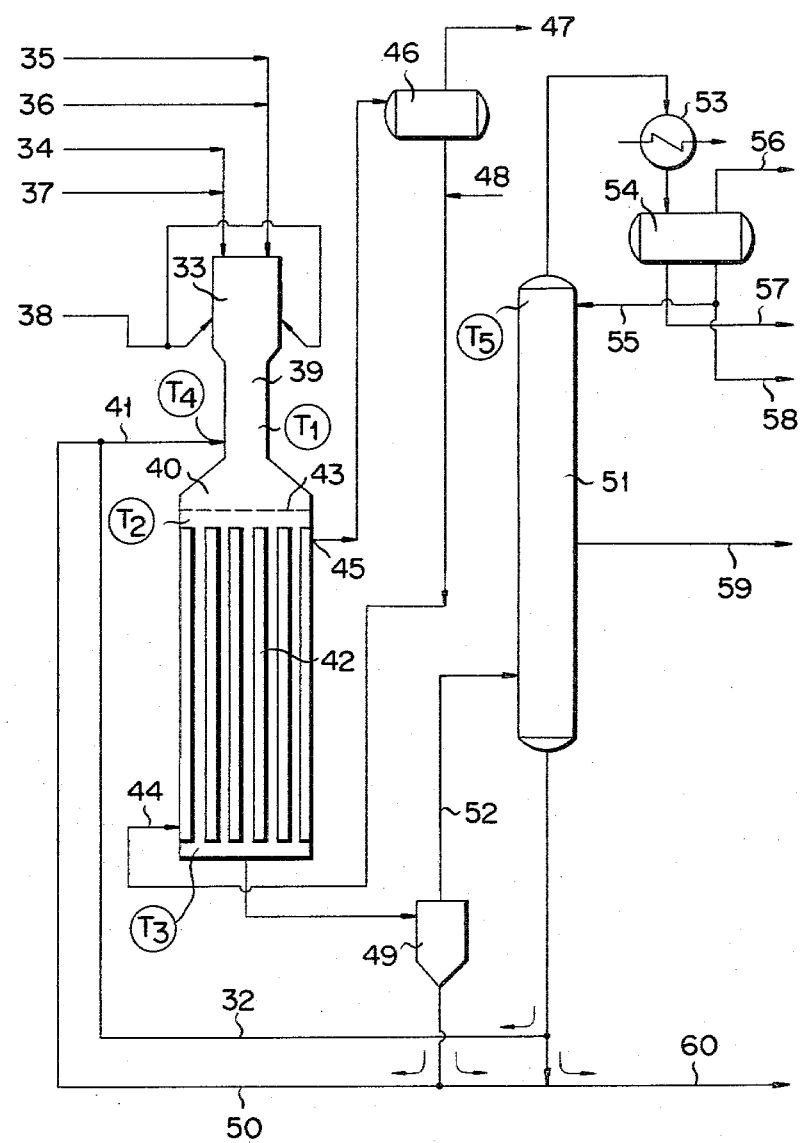
FIG. 3 is a flow sheet of the process described in Example 1.

Thermal cracking of a heavy oil was carried out in accordance with the steps illustrated in a flow sheet shown in FIG. 3, and heat recovery from the high temperature cracked gas product was practiced by the method of this invention.

Into a combustion chamber 33 of 100 mm in diameter and 900 mm in length lined with a refractory material, 50 N m$^3$/hour of oxygen gas and 25 N m$^3$/hour of hydrogen gas were introduced from inlet pipes 34 and 35, respectively. Simultaneously, 25 N m$^3$/hour of methane gas as an auxiliary fuel and 120 kg/hour of steam as a combustion temperature controlling agent were also introduced into the combustion chamber 33 by auxiliary pipes 36 and 37, respectively. By these gases and steam, a combustion flame of about 2000° C. was produced in the combustion chamber 33, into which 100 kg/hour of a distillate of Arabian Light crude oil having a specific weight of 0.824 at 15° C., preheated to 350° C., was sprayed at a gauge pressure of 120 kg/cm$^2$ through spray nozzles 38. Then the mixture of the combustion gas and the distillate entered reaction chamber 39 of 60 mm in diameter and 1000 mm in height connected to the lower end of the combustion chamber 33 lined also with a refractory material for thermal cracking of the distillate to take place for about 2/100 second.

The high temperature cracked gas product thus obtained entered immediately into pre-cooling zone 40, into which about 2500 kg/hour of a quenching oil was sprayed through nozzles 41. The temperatures of cracked gas product, the quenching oil introduced and the pre-cooled mixture are shown in the following Table 1. The quenched mixture was introduced into nineteen pipes made of stainless steel SUS-410 (Standard of American Iron and Steel Institute) in a tube-and-shell type heat exchanger 42 directly connected to the pre-cooling zone 40 through a fluid distributing perforated plate 43. A suitable amount of high pressure water was introduced into the shell side of the heat exchanger 42 through an inlet pipe 44, and heat exchange between the quenched mixture and the water occurred for recovery of a high pressure steam. From outlet 45, the mixture of high pressure water and steam was withdrawn from the heat exchanger 42, and introduced into steam drum 46 by natural circulation to separate the steam and condensed water. The high pressure steam was taken out from the steam drum 46 through outlet 47 for any use, and the residual water was returned to the inlet 44 together with a fresh replenishing water 48.

The gas-liquid mixture withdrawn from the bottom of the heat exchanger 42 was introduced into knock-out drum 49, where the heavy fraction was separated from the gaseous components. The greater part the heavy liquid fraction was returned to the nozzles 41 through a conduit pipe 50 as the quenching oil, and the gaseous component together with light oil fraction, a middle oil fraction and water vapor were introduced into a cooling type separation column 51 of 1000 mm in diameter and 11000 mm in height, having twenty-five trays therein each equipped with bubble caps, through pipe 52 for performing the separation of every component. The cooling of the separation column 51 was carried out by refluxing therethrough the lights oil which was condensed in cooler 53 disposed above the top of separation column 51, separated from gaseous substances and condensed water in oil-water separator 54 and introduced into the upper part of the separation column 50 through pipe 55. The reflux rate of the light oil was controlled so as to maintain the top temperature T5 at 128° C. Cracked gas, condensed water, part of the light oil, medium oil and part of the heavy oil were taken out from pipes 56, 57, 58, 59 and 60, respectively.

The control of pitch content in the quenching oil was carried out by varying the flow and the temperature of said oil, the operating conditions of the system and the addition of a small amount of a heavy oil fraction taken out from the bottom of the cooling column 51. Although not shown in the figure, a small amount of quenching oil was flowed the wall surface of pre-cooling zone 40 in order to protect the whole inside surface of the wall with a thin film layer of said oil as described before. The linear velocity of gas flow in heat exchanger tubes 42 was about 20 meters per second and the pressure loss therein was about 0.15 kg/cm$^2$.

The operation of this Example was carried out 960 hours under the substantially constant condition of thermal cracking. The amount of cracked gas product was about 105 N m$^3$ per hour, that is, about 70% by weight on the basis of raw hydrocarbons.

The composition of the gas product obtained was as follows.

|  | % by volume |  | % by volume |
| --- | --- | --- | --- |
| $CO_2$ | 15.48 | $C_3H_6$ | 5.07 |
| $CO$ | 6.50 | $C_3H_4$ | 0.55 |
| $H_2$ | 26.47 | $C_4H_{10}$ | 0.65 |
| $CH_4$ | 10.31 | $C_4H_8$ | 0.99 |
| $C_2H_2$ | 1.65 | $C_4H_6$ | 1.60 |
| $C_2H_4$ | 20.59 | $C_4H_4$ | 0.16 |
| $C_2H_6$ | 1.35 | $H_2S$ | 0.39 |
| $C_3H_8$ | 0.28 | Remainder | 7.96 |

The amount of liquid product obtained was 29.50% by weight on the basis of raw hydrocarbons. The components of the liquid product were as follows.

|  | % by weight |
| --- | --- |
| Light oil (boiling point up to 170° C.) | 11.02 |
| Medium oil (boiling point 170° to 270° C.) | 4.58 |
| Heavy oil and pitch (boiling point more than 270° C.) | 13.90 |

During the 960 hours operation, some variations of operating conditions were recognized. Those variations in conditions and the results thereof are shown collectively in Table 1.

TABLE 1

Variations in conditions and results thereof

| Components | Example No. of variations | | | |
|---|---|---|---|---|
| | No. 1 | No. 2 | No. 3 | No. 4 |
| Reaction temp. ($T_1$) (°C.) | 905 | 905 | 905 | 905 |
| Pre-cooling temp. ($T_2$) (°C.) | 363 | 367 | 378 | 343 |
| Temperature ($T_3$) at outlet of heat exchanger (°C.) | 310 | 312 | 340 | 288 |
| Pitch content in quenching oil (wt. %) | 27 | 50 | 77 | 50 |
| Circulating rate of quenching oil (kg/hr.) | 2300 | 2300 | 3400 | 2300 |
| Temperature ($T_4$) of quenching oil at inlet (°C.) | 310 | 312 | 340 | 288 |
| Pressure of recovered steam (kg/cm$^2$) | 65 | 65 | 65 | 44 |
| *Efficiency of heat recovery (%) | 68.2 | 69.0 | 65.3 | 69.0 |

*Efficiency of heat recovery: The percentage of the heat energy recovered as high-pressure steam to the enthalpy of the entire reaction products derived from the reaction chamber at temperatures of from 905° C. to 128° C.

As seen in Table 1, the quenching oil can contain from 27 to 77% by weight of pitch having a boiling point of more than 550° C. It will be understood that even if a quenching oil containing more than 70% by weight of pitch is used, the efficiency of heat recovery is more than 65%. Moreover, the over-all heat transfer coefficient of the heat exchanger 42 was maintained at 350 to 400 K cal/cm$^2$·hr.°C. during the whole operation of 960 hours. When the operations were finished, neither the formation of coke nor corrosion of the apparatus was observed.

EXAMPLE 2

The same apparatus and heat recovery system were used as in Example 1. Good results were obtained, demonstrating the applicability of this invention to various conditions of cracking of several kinds of feed oil. The typical results are shown in Table 2.

TABLE 2

| Components | Experimental results | | |
|---|---|---|---|
| | Number of experiments | | |
| | No. 1 | No. 2 | No. 3 |
| Raw oil: | | | |
| Kind | Arabian Light crude oil | Arabian Light distillate | Light naptha |
| Specific gravity | API 34.5 | 0.780 at 15° C. | 0.664 at 15° C. |
| Reaction temperature ($T_1$) (°C.) | 880 | 1000 | 1150 |
| Yield of product: | | | |
| Gas ($H_2$—$C_4$) (wt. %) | 63.5 | 74.3 | 92.0 |
| Ratio of $C_2H_4/C_2H_2$ | 20 | 5.5 | 1.2 |
| Liquid (wt. %) | 36.5 | 25.7 | 8.0 |
| Light oil (under 170° C.) | 10.8 | 8.4 | 4.3 |
| Medium oil (170°–270° C.) | 4.3 | 5.1 | 1.4 |
| Heavy oil (above 270° C.) | 21.4 | 12.2 | 2.3 |
| Pre-cooling temp. ($T_2$) (°C.) | 360 | 365 | 395 |
| Temperature ($T_3$) at outlet of heat exchanger (°C.) | 310 | 310 | 310 |
| Pitch content in quenching oil (wt. %) | 50 | 50 | 50 |
| Circulating rate of quenching oil (kg/hr.) | 2400 | 3400 | 5100 |
| Temperature ($T_4$) of quenching oil at inlet (°C.) | 310 | 310 | 310 |
| Gas pressure drop in heat exchanger tubes (kg/cm$^2$) | 0.15 | 0.2 | 0.55 |
| Pressure of recovered steam (kg/cm$^2$) | 65 | 65 | 65 |
| Efficiency of heat recovery (%) | 68.2 | 71.5 | 74.0 |

EXAMPLE 3

The thermal cracking tests of naphtha and a light oil were carried out using a tubular thermal cracking furnace in place of the thermal cracking furnace for a crude oil which was the source of gas in Example 1 and the cracked products thus obtained was introduced into the same heat recovery system as in Example 1, thereby confirming the applicability of the process of this invention for these feed stocks. In this case, the number of the tubes of the heat exchanger was eleven.

The furnace used for practicing the thermal cracking had tubes of 41.2 mm in inside diameter and 35,000 mm in total length made of stainless steel SUS-304, and the furnace was equipped with a burner of Japanese Pat. No. 492,879. The burner uses a mixture of methane and hydrogen as a fuel. The thermally cracked naphtha of gas oil product was introduced into the aforesaid heat recovery system to cool and recover the heat as high-pressure steam.

In this case, no coking was observed as in Examples 1 and 2. The experimental results are shown in Table 3.

TABLE 3

| Components | Experimental results | |
|---|---|---|
| | Number of experiment | |
| | No. 4 | No. 5 |
| Raw oil: | | |
| Kind | Naphtha | Light oil |
| Specific gravity | 0.728 at 15° C. | 0.830 at 15° C. |
| Reaction temperature (°C.) | 810 | 857 |
| Yield of product: | | |
| Gas ($H_2$—$C_4$) (wt. %) | 63.9 | 61.8 |
| Ratio of $C_2H_4/C_2H_2$ | 99 | 42 |
| Liquid (wt. %) | 36.1 | 38.2 |
| Light oil (under 170° C.) | 27.4 | 20.5 |
| Medium oil (170°–270° C.) | 5.5 | 6.2 |
| Heavy oil (above 270° C.—) | 3.2 | 11.5 |
| Pre-cooling temperature ($T_2$) (°C.) | 361 | 363 |
| Temperature ($T_3$) at outlet of heat exchanger (°C.) | 310 | 312 |
| Pitch content ($T_4$) of quenching oil (wt. %) | 50 | 50 |
| Circulating rate of quenching oil (kg/hr.) | 1800 | 1300 |
| Temperature ($T_4$) of quenching oil at inlet (°C.) | 310 | 312 |
| Gas pressure drop in heat exchanger tubes (kg/cm$^2$) | 0.15 | 0.15 |
| Pressure of recovered steam (kg/cm$^2$) | 65 | 65 |
| Efficiency of heat recovery (%) | 62.0 | 61.4 |

EXAMPLE 4

Coal was pyrolyzed in a fluid bed under a pressure of hydrogen-rich gas (hydrocarbonized) at 540° C. and 70 bars. The gas-vapor product thus obtained was introduced into the heat recovery system of this invention as in Example 1, confirming the applicability of this invention to this and other processes involving a decomposition or reaction of coal at elevated temperatures. The number of tubes in the heat exchanger was 14.

The pressure reactor used for the hydrocarbonization step had an internal diameter of 2.0 meters, and a total height of 10 meters, including 5 meters of fluidized bed and 5 meters of freeboard. Vapor and gas product was removed overhead through a cyclone system to remove fine coal char product carried over from the reactor. A recycle quench-oil was introduced to precool this vapor-gas product and the quench-oil and precooled product were introduced into the aforesaid heat recovery system for cooling with recovery of heat as high pressure steam. As in Examples 1 and 2, the heat recovery system remained free of coke.

The experimental results are shown in Table 4.

TABLE 4

| Coal-subbituminous C from Lave de Smet, Wyoming | | |
|---|---|---|
| Analysis, wt. % | C | 73.2 |
|  | H | 5.5 |
| (Moisture and Ash Free) | N | 1.3 |
|  | S | 0.8 |
|  | O | 19.2 |
| Ash, wt. %, dry basis |  | 13.8 |
| Coal feed rate, dry basis (kg/hr) |  | 15 |
| Reactor temperature, °C. |  | 540 |
| Product yields, wt. % of moisture and ash-free coal | Gas C$_4$ liquid | 19.9 |
|  | including tar & pitch | 28.0 |
|  | Water | 18.3 |
|  | Char | 35.8 |
|  | Hydrogen consumed, kg/100kg MAF coal | 2.2 |
| Pre-cooling temperature, °C. |  | 365 |
| Outlet temperature of heat exchanger, °C. |  | 310 |
| Circulation rate of quench oil (kg/hr) |  | 30000 |
| Inlet temperature of quench oil, °C. |  | 310 |
| Pressure loss |  | Negligible |
| Heat recovery, % |  | 52 |
| % pitch in quenching oil |  | 30 |
| Pressure of steam recovered (kg/cm$^2$) |  | 65 |

We claim:

1. A method of recovering heat from a high temperature gas product obtained by thermal decomposition of hydrocarbons in the form of high pressure steam which comprises
   (a) precooling, in a vessel comprising a precooling zone, a heat exchange zone and a separating zone, the high temperature gas product in the precooling zone by mixing said gas product with a sprayed low temperature hydrocarbon oil of a by-product obtained from said thermal decomposition of hydrocarbons, which contains from 30 to 80 percent by weight of a pitch based on the weight of said sprayed low temperature hydrocarbon oil, as a quench to a temperature of from 300° C. to 400° C.;
   (b) passing the resulting mixture downwardly from the precooling zone through the tubes of a substantially vertical shell-and-tube type heat exchange means, at a linear gas velocity of 15 to 50 meters per second in said tubes to form a thin liquid film layer of the sprayed oil on the inside walls thereof, and transferring the heat contained in said resulting mixture into a high pressure water flowing through the shell side of the heat exchange means and recovering therefrom a high pressure steam of from 40 to 100 kg/cm$^2$;
   (c) separating the said hydrocarbon oil in the separating zone from said resulting mixture passed through the tubes of said heat exchange means downwardly to the separating zone; and
   (d) recirculating the separated hydrocarbon oil as a quench to the precooling zone.

2. The method of claim 1, wherein the high temperature gas product is obtained by cracking a material selected from the group consisting of naphtha, gas oil, crude oil and residue.

3. The method of claim 1, wherein the high temperature gas product is obtained by carbonization, hydrocarbonization, gasification or hydrogasification of coal.

4. The method of claim 1, wherein a portion of the quench is flowed downwardly along the inside wall of the precooling zone.

5. The method of claim 1, wherein steam at above 150° C. is passed into the precooling zone.

6. The method of claim 1, wherein steam at above 150° C. and a portion of the quench are passed into and downwardly along the inside wall of the precooling zone.

7. The method of claim 1, wherein the inlet temperature of the quench is in the range of from 250° C. to 350° C.

8. The method of claim 1, wherein the inlet temperature of the high temperature gas product is in the range of from 450° C. to 1400° C.

9. The method of claim 1, wherein said linear gas velocity is between 20 and 50 meters per second.

10. A method of recovering heat from a high temperature gas product obtained by thermal decomposition of hydrocarbons in the form of high pressure steam in a vertical vessel comprising downwardly a precooling zone, a heat exchange zone and a separating zone, which comprises the steps of
    (a) precooling the high temperature gas product in the precooling zone by mixing said gas product with a sprayed low temperature hydrocarbon oil, which contains from 30 to 80 percent by weight of a pitch based on the weight of said sprayed low temperature hydrocarbon oil, as a quench to a temperature of from 300° C. to 400° C.;
    (b) passing the resulting mixture downwardly from the precooling zone through the tubes of a vertical shell-and-tube type heat exchange means at a linear gas velocity of from 15 to 50 meters per second in said tubes to form a thin liquid film layer of the sprayed oil on the inside walls thereof, and transferring the heat contained in said resulting mixture into a high pressure water flowing through the shell side of the heat exchange means to recover therefrom a high pressure steam of from 40 to 100 kg/cm$^2$;
    (c) separating the said hydrocarbon oil in the separation zone from said resulting mixture passed through the tubes of said heat exchange means downwardly to the separating zone; and
    (d) recirculating the separated hydrocarbon oil as a quench to the precooling zone.

11. The method of claim 10, wherein the high temperature gas product is obtained by cracking gas oil or crude oil; a portion of the quench is flowed downwardly along the inside wall of the precooling zone; steam at about 150° C. and a portion of the quench are passed into and downwardly along the inside wall of the precooling zone; the inlet temperature of the quench is in the range of from 250° C. to 350° C.; the inlet temperature of the high temperature gas product is in the range of from 450° C. to 1400° C.; and said linear gas velocity is between 20 and 50 meters per second.

* * * * *